April 22, 1958 P. M. WRIGHT ET AL 2,831,974

AUTOMATIC FREQUENCY CONTROL SYSTEMS

Filed Sept. 10, 1954 2 Sheets-Sheet 1

Inventors:
Peter Maurice Wright
and
Andrzej Kamal Kwasieborski
By their attorneys:
Baldwin & Wight

AUTOMATIC FREQUENCY CONTROL SYSTEMS

Filed Sept. 10, 1954 2 Sheets-Sheet 2

Inventors:
Peter Maurice Wright
and
Andrzej Kamal Kwasieborski
By their attorneys:
Baldwin & Wight United States Patent Office 2,831,974

Patented Apr. 22, 1958

2,831,974

AUTOMATIC FREQUENCY CONTROL SYSTEMS

Peter Maurice Wright, Great Waltham, and Andrzej Kamal Kwasieborski, Chelmsford, England, assignors to Marconi's Wireless Telegraph Company Limited, London, England, a British company Application September 10, 1954, Serial No. 455,136

8 Claims. (Cl. 250—36)

Figure 1:
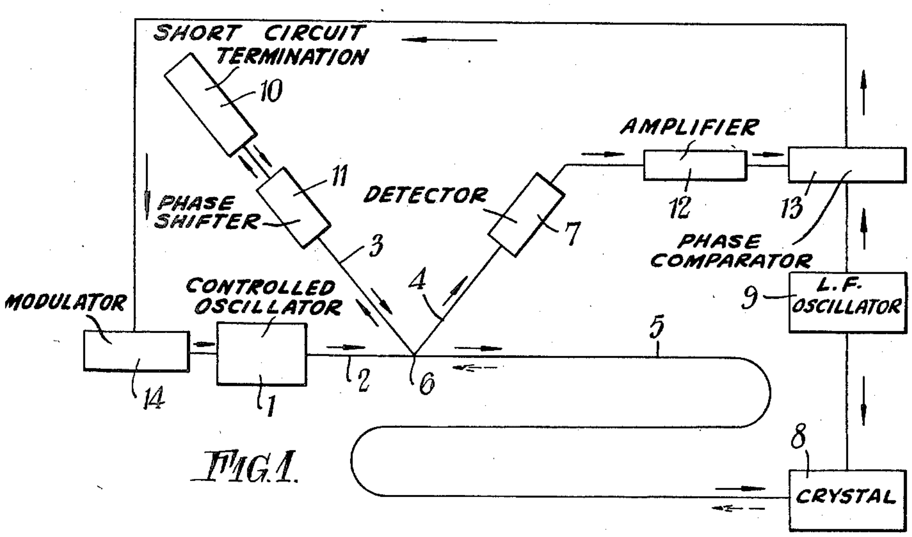

This invention relates to automatic frequency control systems and has for its object to provide improved, relatively simple, and accurate systems whereby a source of micro-wave oscillations may be automatically controlled in a desired manner either to remain stabilized at a given frequency (which may be varied) or to vary or be modulated in frequence as may be desired. Although not limited to its application thereto, the invention may be used for the frequency modulation of the micro-wave oscillator of a frequency modulated radar system.

According to this invention an automatic frequency control system for controlling the frequency of a source of very high frequency oscillations comprises four high frequency transmission channels, one end of each of the four channels, meeting at a hybrid junction, one of said channels being an input channel, a second being an output channel, a third being a wave reflecting channel of predetermined electrical length and the fourth also being a wave reflecting channel but of much longer length than the third, means for applying oscillations from the source to be controlled to the remaining end of said input channel, a radio frequency amplitude detector at the remaining end of the output channel, a short circuit at the remaining end of one of the reflecting channels, a modulator at the remaining end of the other reflecting channel, a source of frequency which is low in relation to the frequency of the source to be controlled, means for applying said relatively low frequency to said modulator, and means responsive to phase difference between said relatively low frequency and the output from said detector for controlling the frequency of the source to be controlled in the sense required to maintain zero phase difference between said relatively low frequency and said detector output.

The channels may be waveguides or transmission lines of any convenient form and any suitable form of hybrid junction may be employed.

Where the source to be controlled is required to maintain a fixed predetermined frequency, the short circuited reflecting channel will be of fixed electrical length chosen in dependence on said fixed predetermined frequency. Where the frequency is required to be modulated it is not necessary for the channel in question to be of fixed length (though it still may be) for, by varying, in accordance with the required modulation, the electrical length of said channel, the frequency generated will be made to follow the length variations. These variations may be mechanically or electrically produced in dependence upon the rate at which such variations are required—mechanically when only slow or time-to-time variations are required but electrically in the case where high speed variations or frequency modulation is required. Where the channels are waveguides mechanical variation of length may be obtained by terminating the short circuit reflecting channel, at the end remote from the hybrid junction, with an adjustable short circuiting piston. In the case of high speed variations or frequency modulation said channel may be provided at the end remote from the junction, with a gas discharge tube of variable ionizing current which is varied to produce the required changes, or with a piece of ferro-magnetic ferrite under the influence of a magnetic field which is varied to produce the required changes. Where the changes required are not too rapid and are cyclic and repetitive in character—as in the case of the oscillator of a frequency modulated radar system—the channel in question may be provided, at the said end, with a mechanically driven phase shifter such for instance as a rotated, eccentrically mounted dielectric disc which penetrates into the guide through a slot in the wall thereof so that, in one rotation, the extent of penetration varies in one cycle of variation in accordance with a predetermined law.

In all these arrangements in which variations of electrical length of the shorter reflecting channel are utilized to produce frequency modulation or variation the result is obtained because the effect of altering the electrical length is to shift slightly the value of the reflected frequency with relation to the frequency of the incoming wave which is reflected. The action is like that obtained by Doppler effect when a moving reflecting surface reflects an incident wave and changes its frequency by virtue of the movement. Any other means, therefore, for modulating or changing the frequency of the reflected wave in relation to the incident wave, will produce the same result. Such means may be constituted, for example, by a frequency changer of the single side band type and where such means is employed under the control of the modulating frequency, the shorter reflecting arm will be of fixed electrical length. The use of means such as a single side band frequency changer in place of moving the short-circuit at the end of the shorter reflecting arm is to be preferred because, with such means, the modulation response is inherently determined by the length of the longer reflecting arm in relation to the modulation frequency employed and may therefore readily be made of high linearity whereas to achieve high linearity by moving the short circuit to effect modulation is, if not impossible, at any rate very difficult and involves mechanical or electrical complexity.

Figure 2:
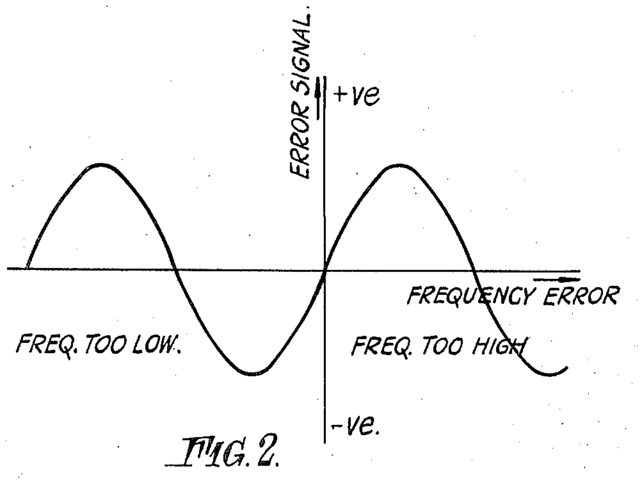

The invention is illustrated in and further explained in connection with the accompanying drawing in which:

Fig. 1 is a simplified block diagram of one embodiment;

Fig. 2 typifies the operating characteristic obtained; and

Figure 3:
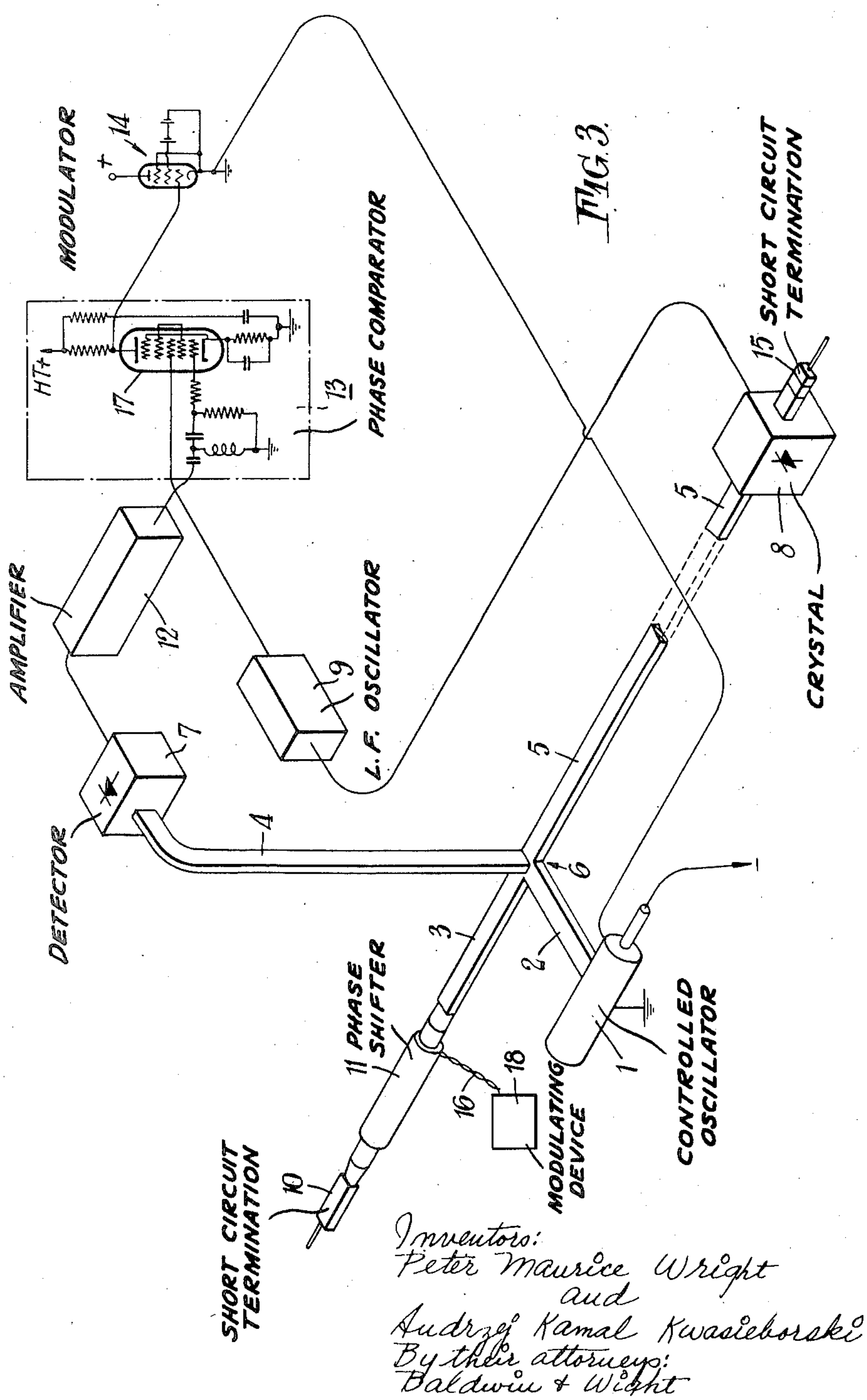

Fig. 3 shows, in more detail, the embodiment represented in block diagram form in Fig. 1.

Referring to Figs. 1 and 3, a magnetron or other oscillator whose frequency is to be controlled is indicated at 1 and feeds into the open end of the input arm 2 of a four arm wave guide assembly whose other three arms are indicated at 3, 4 and 5 and which meet at a hybrid junction 6 of any convenient known form, such as a so-called "rat-race" or as represented a "magic T." The output arm 4 feeds into a radio frequency amplitude detector 7 responsive to amplitude modulation and constituted by a crystal. The remaining two wave guide arms 3 and 5 are both short circuited at the ends remote from the junction 6 so that both reflect. The arm 5 is much longer than the arm 3 and its terminating short circuit (beyond the apparatus 8 to be referred to later) is of the adjustable piston type and is shown at 15 in Fig. 3. The terminating short circuit for the arm 3 is similar and is shown at 10 beyond the apparatus 11 to be described later.

If a wave reaches the junction 6 from the source 1 via the arm 2 it will travel up each of the arms 3 and 5, be reflected from the short circuited ends thereof and reappear at the junction, the phase shift produced in travelling up and back along each of these arms depending on the electrical length of the arm in question which in turn depends on frequency. As change in electrical length with frequency is proportional to the electrical length itself the phase at the junction end of the long arm 5 will vary with frequency much more rapidly than that at the junction end of the short arm and therefore the difference between two phases will vary with frequency. Over a range of frequency variation in which the frequency change can be regarded as small, the phase difference change produced by a wave guide arrangement as so far described is, as is known, approximately proportional to frequency change. Also, as is known, the power travelling up the output arm 4 will depend upon the phase difference, being a maximum when said difference is 180° and a minimum when it is zero.

The long arm 5 (shown folded in Fig. 1 and broken away in Fig. 3) includes, near its short-circuited end, a modulating crystal 8 across which is applied a frequency which is low in relation to that from the source 1 and which is supplied from an oscillator 9 such as a valve oscillator. The crystal 8 is well matched to the guide arm 5 for the working frequency range when no modulating signal is applied and therefore the wave reflected back from crystal 8 towards the junction 6 will consist, as is known, of the side bands (due to the relatively low frequency modulation) but no carrier i. e. the carrier is suppressed.

Near the short-circuited end of the short arm 3 is a variable phase shifter 11, which may be of known type and is conventionally represented as a line stretcher. The phase shift it introduces is controllable by a source 18 of modulation applied at terminals 16. Any suitable form of controllable phase shifter may be used, e. g. a rotating eccentric dielectric disc insertable in the wave guide to an adjustable extent, or a variable ionizable gas discharge tube inserted in the guide or, as already mentioned, a line stretcher which may be constituted by a variably magnetizable ferrite piece in the guide. The phase shifter, however, is only required where modulation is to be effected and for the moment its presence in the circuit may be ignored. Since the short arm 3 is terminated by the short circuit 10 the wave reflected thereby will consist of unmodulated "carrier" only—the "carrier" being, of course, derived from the source 1, and the reflected wave being of the same frequency as the source 1 if there is no device 11 and differing from the frequency of the source 1 if a device 11 is present and operated.

The two reflected waves—the suppressed carrier double side band wave from arm 5, and the unmodulated carrier from arm 3—combine at the junction to produce a resultant which depends on the phase difference between them. In effect a carrier (from arm 3) is "inserted" in a suppressed carrier wave (from arm 5) producing a resultant in accordance with the well known principles of suppressed carrier double side band systems. In accordance with these principles the amplitude of the low frequency component (from oscillator 9) in the envelope of the combined or resultant wave will be roughly proportional to sin $\varphi$ where $$\left(\varphi+\frac{\pi}{2}\right)$$

is the phase angle between the "carrier" from arm 3 and the "suppressed carrier" from arm 5. The change of sign which occurs as $\varphi$ passes through zero, is interpretable as a reversal of the phase of the low frequency envelope.

Some of the combined wave (one half thereof when $\varphi=0°$) reaches the detector 7 which is responsive to the amplitude of the radio frequency wave but not (so far as possible) to its phase. If this detector is approximately linear its output will also be approximately proportional to sin $\varphi$. Since $\varphi$ varies with frequency, if the short circuit at the end of arm 3 is adjusted so that $\varphi=0°$ at a desired frequency to which the source 1 is to be controlled, $\varphi$ will be approximately proportional to frequency error, i. e. to departure of the frequency of source 1 from the desired frequency.

The output from the detector 7, after amplification in an amplifier 12, if required, is fed as one input to a phase comparator 13 whose other input is a reference phase signal from source 9. The phase comparator 13 may be of any known type and is adapted to produce an error correcting D. C. As shown it is of the known type comprising a pentagrid valve 17 with the two signals to be phase compared fed to the first and third grids, the second and fourth grids being screen grids and the fifth grid a suppressor. A D. C. potential representative of the phase of difference between the two input signals appears at the anode of valve 17. This D. C. potential will change sign (polarity) as one input (that from detector 7) reverses in phase with respect to the other. The error correcting signal will thus vary with sin $\varphi$ and is fed back and employed in any convenient known way for example by means of a reactance valve or modulator 14 controlling the frequency of the source 1 to make $\varphi$ equal to zero. As shown in Fig. 3, a current modulator constituted by a pentode 14 is used, the anode-cathode space of this valve being in the H. T. supply circuit to the magnetron 1 and its conductivity being controlled by the potential applied from the anode of valve 17 to the control grid. Current variations in the anode circuit of the magnetron 1 thus produced of course vary the frequency of the magnetron. The modulator 14 is, like the phase shifter 11, optional and may be for the moment ignored.

Fig. 2 shows the relation between frequency error (abscissae) and error signal (ordinates) obtained from the phase comparator 13 of a system as shown in Figs. 1 and 3. It will be observed that the system has the advantage that it always works close to the null point—the point at which there is zero error signal—even if the frequency of the oscillator 1 is being modulated because such modulation is itself obtained by shifting the null point. Hence very wide frequency deviations can be made without sacrifice of stability. Moreover, since the position of the null point itself determines the frequency to which the system adjusts itself, the gain of the feedback loop from detector 7 back to the oscillator 1 determining only the exactitude with which the frequency follows the null point, variation of this gain produces only second order effects on the frequency produced. This is of great practical importance because it is very difficult, practically, to keep this gain constant. Further any nonlinearity in the phase comparator only affects feed-back loop gain and therefore produces only third order effects on the frequency.

The number of wave lengths in the long reflecting arm 5 changes smoothly with frequency and each time this number changes by one the phase reflected at the junction 6 has changed by 2 $\pi$ and this phase can be changed by many times 2 $\pi$ so long as there is enough gain round the feed-back loop to keep $\phi$ smaller than $\pi/2$. If the number of wave lengths in the long arm is decreased, i. e. the frequency is lowered, a point is reached when it can no more be considered "long" and this sets a limit to frequency variation in the downward direction. There is no corresponding theoretical upper limit though a practical upper limit is set by the performance obtainable from a practical phase shifter (11 of Fig. 1). Phase shifts exceeding three and a half wave lengths have, however, been experimentally obtained. Practical limits are, of course, also set by the tuning range of the oscillator 1 itself.

When the phase shifter 11 is used to modulate the frequency of the magnetron 1, changes in phase of the waveform in wave guide arm 3 brought about by the phase shifter, disturb the relationship of phase quadrature which exists between the above waveform and the suppressed carrier wave in wave guide arm 5, when the system is locked onto a desired frequency. The above change in phase relationship causes in the manner already described a correcting signal to be applied via phase comparator 13 to alter the frequency of magnetron 1 and thus in effect the electrical length of wave guide arm 5 and the phase of said suppressed carrier wave. Said phase will continue to alter until the above described relationship of phase quadrature is regained.

Any non-linearity of the phase shifter 11 is not likely to change and is in any event independent of the center frequency to which the system is set by the adjustment of the position of the short circuit 10. Undesired effects of a non-linear phase shifter characteristic can, therefore, be compensated, if desired, by suitable shaping of the input thereto.

As the efficiency of a typical modulator crystal (8) is not likely to be materially better than 10% or thereabouts, and as, in any event, the total attenuation along the long arm 5 is greater than along the short one 3, a considerable amount of attenuation can be tolerated in the phase shifter 11 without causing over-modulation of the reconstituted wave sent up the output arm 4. For this reason any variation of attenuation with phase by the phase shifter 11 will be of very small and practically negligible effect.

The system illustrated in Figs. 1 and 3 can be variously modified in accordance with requirements. Modulation of the source 1 will not be provided if not required, i. e. phase shifter 11 may be omitted in such a case and the block will be a simple frequency control unit as distinct from a frequency modulator. The assembly 2, 3, 4, 5 may be a transmission line assembly instead of a wave guide assembly and any appropriate form of hybrid junction can be used at 6. The positions of the modulator crystal 8 and the adjustable short circuit 10 can be interchanged and in this case, as well as that illustrated in Fig. 1 the phase shifter 11 (if any) may be in the long arm 5 instead of in the short one 3. The illustrated arrangement with the adjustable short circuit 10 and the phase shifter 11 in the short arm is preferred as tending less to over-modulation if a lossy phase shifter is employed. Finally the modulator crystal 8 may be replaced by any other form of modulator known per se.

While we have described our invention in one of its preferred embodiments, we realize that modifications may be made, and we desire that it be understood that no limitations upon our invention are intended other than may be imposed by the scope of the appended claims.

We claim:

1. An automatic frequency control system for controlling the frequency of a source of very high frequency oscillations, the system comprising four high frequency transmission channels, one end of each of the four channels meeting at a hybrid junction, one of said channels being an input channel, a second being an output channel, a third being a wave reflecting channel of predetermined electrical length and the fourth also being a wave reflecting channel but of much longer length than the third, means for applying oscillations from the source to be controlled to the remaining end of said input channel, a radio frequency amplitude detector at the remaining end of the output channel, a short circuit at the remaining end of one of the reflecting channels, a modulator at the remaining end of the other reflecting channel, a source of frequency which is low in relation to the frequency of the source to be controlled, means for applying said relatively low frequency to said modulator, and means responsive to the amplitude of output from the detector and to the phase sense of the output from said detector relative to said relatively low frequency for controlling the frequency of the source to be controlled in the sense required to maintain substantially zero output from the detector between said relatively low frequency and said detector output.

2. An automatic frequency control system for controlling the frequency of a source of very high frequency oscillations as set forth in claim 1 and for maintaining the source at a fixed predetermined frequency, wherein the short circuited reflecting channel is of fixed electrical length chosen in dependence on said fixed predetermined frequency.

3. An automatic frequency control system for controlling the frequency of a source of very high frequency oscillations as set forth in claim 1, wherein the frequency of the source is required to be modulated or varied, and wherein the short circuited reflecting channel includes means for modulating or changing the phase of the reflected wave in relation to the incident wave.

4. An automatic frequency control system for controlling the frequency of a source of very high frequency oscillations as set forth in claim 1, wherein the means for modulating or changing the phase of the reflected wave in relation to the incident wave is constituted by a frequency changer of the single side band type.

5. An automatic frequency control system for controlling the frequency of a source of very high frequency oscillations as set forth in claim 1, wherein the frequency of the source is required to be modulated or varied, and wherein the short circuiting reflecting channel is arranged to be of variable electrical length so that the frequency generated by said source will be made to follow the length variations.

6. An automatic frequency control system for controlling the frequency of a source of very high frequency oscillations as set forth in claim 1, wherein the length variations are arranged to be produced mechanically.

7. An automatic frequency control system for controlling the frequency of a source of very high frequency oscillations as set forth in claim 1, wherein the channels are wave guides and wherein the mechanical variation of length is obtained by terminating the short circuited reflecting channel at the end thereof remote from the hybrid junction, with an adjustable short circuiting piston.

8. An automatic frequency control system for controlling the frequency of a source of very high frequency oscillations as set forth in claim 1, wherein the source is a magnetron and wherein the responsive means is adapted to produce an error correcting direct current representative of the amplitude of the output of the detector and phase difference between said relatively low frequency and the output from said detector, and wherein said direct current is arranged to control the conductivity of a modulator valve connected in the anode circuit of said magnetron.

References Cited in the file of this patent

UNITED STATES PATENTS

| | | |
|---|---|---|
| 2,462,841 | Bruck et al. | Mar. 1, 1949 |
| 2,486,001 | Bruck et al. | Oct. 25, 1949 |
| 2,589,861 | Pound | Mar. 18, 1952 |
| 2,681,998 | Pound | June 22, 1954 |